S. D. SCOTT.
Hand-Wagons.

No. 142,285.    Patented August 26, 1873.

Witnesses.
A. Ruppert,
W. Bradford

S. D. Scott
Inventor.
D. P. Holloway & Co.
Attys

UNITED STATES PATENT OFFICE.

SYLVESTER D. SCOTT, OF EUREKA, CALIFORNIA.

IMPROVEMENT IN HAND-WAGONS.

Specification forming part of Letters Patent No. 142,285, dated August 26, 1873; application filed April 7, 1873.

*To all whom it may concern:*

Figure 1:
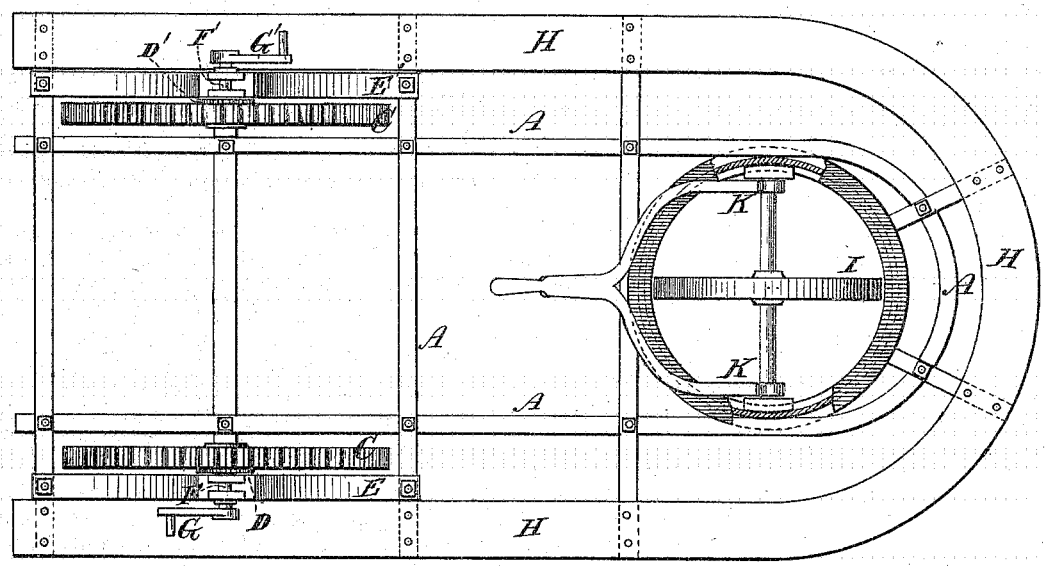
Figure 2:
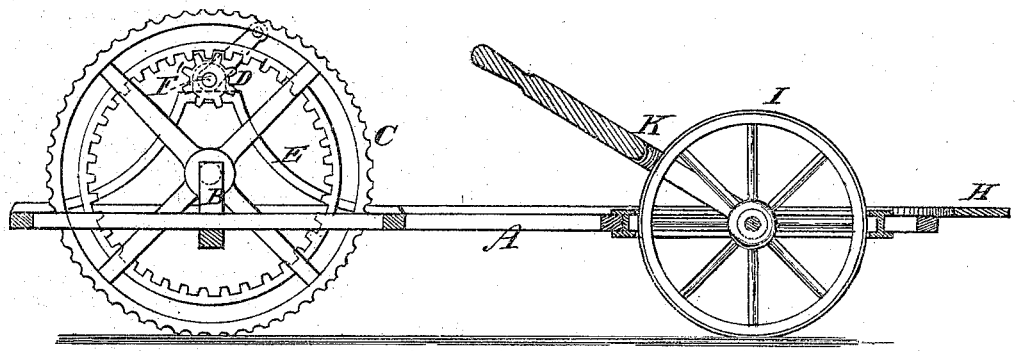

Be it known that I, SYLVESTER DAVID SCOTT, of Eureka, county of Humboldt and State of California, have invented certain Improvements in Running-Gear for Carriages, of which the following is a specification:

Figure 1 is a plan view of my improved device, showing the propelling-wheels with the cranks for turning them, the steering or guide wheel, the platform and frame-work of the machine; and Fig. 2 is an elevation of the same, showing the arrangement of the driving-gear wheels, and of the guide-wheel and steering apparatus.

Corresponding letters denote corresponding parts in both of the figures.

This invention relates to an improved machine, which is designed to be run upon common roads, and upon the earth in other places, it referring to the running-gear thereof; and it consists in the combination of some of the parts of which it is composed, as will be more fully described hereinafter.

In constructing vehicles of this character I use any suitable frame-work, A, of wood or metal, it being constructed as shown, or in a manner that will adapt it to receive and retain in position the axle of the driving-wheels, the steering-wheel, and the platform which wholly or partially covers it. Near the rear end of this frame there is attached an axle, B, which may be of the bent form shown in Fig. 2, or it may be parallel throughout its entire length. This axle is firmly secured to the frame A, and has upon each of its ends a wheel, C, so arranged as to turn freely upon said axle. These wheels may be of any desired diameter and width of face, according to the weight of the machine, their peripheries being corrugated or otherwise roughened, for the purpose of giving them additional adhesion or hold upon the earth. Attached to the arms of the wheels C C, at some distance from their outer surfaces, are internally-toothed wheels or rims, into which mesh the pinions D D', which are held in position by brackets E E', they being attached to the frame A, as shown in Fig. 1 of the drawing. Through the upper portion of these brackets pass shafts F F', upon which the pinions D D' are firmly secured, so that, as the shafts are rotated by means of power applied to cranks G G', secured upon their outer ends, the driving-wheels will be rotated, and the machine will be carried forward or backward, according to the direction in which the cranks are moved.

As this machine is to be propelled by hand, a platform, H, is placed upon the frame-work, and is made to extend around the same outside of the driving and steering wheels, so that the persons employed may have a convenient place to stand while propelling it.

In order that the direction in which this vehicle shall travel may be under the control of the person in attendance, a wheel, I, is placed near its front end, which supports said end, and at the same time gives direction to the machine, its bearings being in boxes, which slide in a groove formed in a horizontal ring secured to the frame A, as shown in Figs. 1 and 2. To the shaft of the wheel I a yoke, K, is hinged, said yoke terminating in a handle, by which means the operator is enabled to place the axis of the wheel I at a right angle to the frame of the machine, for giving it direct movement forward or backward; or he may give said axle any other angle for the purpose of changing the line of movement or for turning curves.

The arrangement of the driving-wheels is such, in consequence of each being independent of the other, that the turning of short curves may be facilitated by ceasing, or partially ceasing, to operate one while the full force is applied to the one which is upon the outside of the curve.

Having thus fully described my invention, what I claim, and desire to secure by Letters Patent, is—

The platform H, in combination with the frame, when arranged with reference to the independently-operating driving-wheels, substantially as set forth.

In testimony whereof I have signed my name to this specification in the presence of two subscribing witnesses.

SYLVESTER D. SCOTT.

Witnesses:
WM. P. HANNA,
JAS. T. KELEHER.